US012590820B2

(12) United States Patent
Matsuda

(10) Patent No.: US 12,590,820 B2
(45) Date of Patent: Mar. 31, 2026

(54) CAPACITANCE DETECTION DEVICE

(71) Applicant: Alps Alpine Co., Ltd., Tokyo (JP)

(72) Inventor: Atsushi Matsuda, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 61 days.

(21) Appl. No.: 18/187,547

(22) Filed: Mar. 21, 2023

(65) Prior Publication Data

US 2023/0221150 A1 Jul. 13, 2023

Related U.S. Application Data

(63) Continuation of application No. PCT/JP2021/037136, filed on Oct. 7, 2021.

(30) Foreign Application Priority Data

Oct. 14, 2020 (JP) ................................. 2020-173382

(51) Int. Cl.
  *G01D 5/24* (2006.01)
(52) U.S. Cl.
  CPC ...................................... *G01D 5/24* (2013.01)
(58) Field of Classification Search
  CPC ..... G01D 5/24; G06F 3/0446; G06F 3/04166; G06F 3/04186; G01R 27/26; H01H 36/00
  USPC .......................... 324/658, 660–663, 679, 686
  See application file for complete search history.

(56) References Cited

U.S. PATENT DOCUMENTS

| | | | |
|---|---|---|---|
| 7,675,296 B2 * | 3/2010 | Lambert | ................ G01B 7/003 |
| | | | 340/576 |
| 10,261,619 B2 | 4/2019 | Shepelev et al. | |

| | | | |
|---|---|---|---|
| 10,817,114 B2 | 10/2020 | Sasai et al. | |
| 11,511,605 B2 | 11/2022 | Fujiyoshi et al. | |
| 2016/0124550 A1 | 5/2016 | Tada et al. | |

(Continued)

FOREIGN PATENT DOCUMENTS

| | | |
|---|---|---|
| JP | 2017-049982 | 3/2017 |
| WO | 2012/141131 | 10/2012 |

(Continued)

OTHER PUBLICATIONS

International Search Report from International Application No. PCT/JP2021/037136 dated Nov. 22, 2021.

*Primary Examiner* — Akm Zakaria

(74) *Attorney, Agent, or Firm* — Beyer Law Group LLP

(57) ABSTRACT

A capacitance detection device for detecting a capacitance between a detection electrode and an object in proximity to the detection electrode includes the detection electrode configured to detect a capacitance between the detection electrode and the object, an active shield electrode disposed in proximity to the detection electrode, a voltage output circuit for outputting an alternating voltage to be supplied to the active shield electrode, a first adjustment circuit for adjusting an amplitude of an alternating voltage output from the voltage output circuit, and a first operational amplifier for amplifying and outputting a voltage difference between an inverting input terminal thereof connected to one end of the detection electrode and a non-inverting input terminal thereof to which an alternating voltage adjusted by the first adjustment circuit is applied. The detection electrode has, between one end and the other end thereof, a resistance value from 5 kΩ to 270 kΩ.

6 Claims, 7 Drawing Sheets

(56)  References Cited

U.S. PATENT DOCUMENTS

| | | | | |
|---|---|---|---|---|
| 2017/0212635 A1* | 7/2017 | Cordeiro | ............. | G06F 3/04182 |
| 2019/0294297 A1* | 9/2019 | Sasai | ................... | H03K 17/955 |
| 2020/0207189 A1* | 7/2020 | Fujiyoshi | ............... | G01B 7/001 |
| 2021/0389842 A1 | 12/2021 | Fujiyoshi | | |
| 2022/0244299 A1* | 8/2022 | Fujiyoshi | ............. | H03K 17/955 |

FOREIGN PATENT DOCUMENTS

| | | |
|---|---|---|
| WO | 2015/005319 | 1/2015 |
| WO | 2018/116706 | 6/2018 |
| WO | 2019/064595 | 4/2019 |
| WO | 2019/064858 | 4/2019 |
| WO | 2020/183869 | 9/2020 |

* cited by examiner

20

111A

112A 118          118          118

CONTROL CIRCUIT          22

X

Y

CAPACITANCE DETECTION DEVICE

CLAIM OF PRIORITY

This application is a Continuation of International Application No. PCT/JP2021/037136 filed on Oct. 7, 2021, which claims benefit of Japanese Patent Application No. 2020-173382 filed on Oct. 14, 2020. The entire contents of each application noted above are hereby incorporated by reference.

BACKGROUND OF THE INVENTION

1. Field of the Invention

The present invention relates to a capacitance detection device.

2. Description of the Related Art

International Publication No. WO 2015/005319 discloses a technique for preventing a noise current from entering a control circuit by conditioning the line width and resistance value of a terminal wiring portion on a wiring board. The wiring board has, in a conductive portion disposed on the surface of an insulating substrate, a plurality of electrode portions, a plurality of terminal portions, and the terminal wiring portion connecting corresponding one of the electrode portions and corresponding one of the terminal portions.

International Publication No. WO 2019/064595 discloses a technique capable of, in a touch sensor panel, preventing the reduction in touch sensitivity due to the elongation of a touch sensor effective region and avoiding inserting a region that does not contribute to touch detection into the touch sensor effective region by deciding conditions for a sensor length. The touch sensor panel includes a first sensor group and a second sensor group provided on respective surfaces of a substrate and oriented in directions intersecting each other, and the touch sensor effective region is formed by the first sensor group and the second sensor group.

In a mutual capacitance type capacitance detection device in the related art, the lower the resistance value of a detection electrode, the smaller the reduction in a capacitance detection value. Accordingly, a detection electrode having a small resistance value is generally preferred. However, since clear specifications are not defined for the resistance value of a detection electrode, specifications need to be determined by simulation every time.

On the other hand, an absolute/self-capacitance type capacitance detection device uses the change in the capacitance of a detection electrode depending on the resistance value of a detection electrode. Accordingly, there are limitations on the range of the resistance value of the detection electrode and a capacitance between the detection electrode and an active shield electrode, and sufficient detection performance cannot be obtained if the resistance value is out of the range.

SUMMARY OF THE INVENTION

A capacitance detection device according to an embodiment for detecting a capacitance between the capacitance detection device and an object includes a detection electrode configured to detect a capacitance between the detection electrode and the object, an active shield electrode disposed in proximity to the detection electrode, a voltage output circuit configured to output an alternating voltage to be supplied to the active shield electrode, a first adjustment circuit configured to adjust an amplitude of an alternating voltage output from the voltage output circuit, and a first operational amplifier configured to amplify a voltage difference between an inverting input terminal of the first operational amplifier and a non-inverting input terminal of the first operational amplifier and output the amplified voltage difference, the inverting input terminal being connected to one end of the detection electrode, the non-inverting input terminal receiving an alternating voltage adjusted by the first adjustment circuit. The detection electrode has, between the one end and another end of the detection electrode, a resistance value from 5 kΩ to 270 kΩ.

According to an embodiment, in a capacitance detection device capable of detecting the proximity position of an object on the basis of the change in the capacitance value of a detection electrode having a resistance gradient, a capacitance value can be appropriately detected depending on the operating range of a detection circuit.

DESCRIPTION OF THE PREFERRED EMBODIMENTS

An embodiment will be described below with reference to drawings.

Exemplary Structure of Capacitance Detection Device

Figure 1:
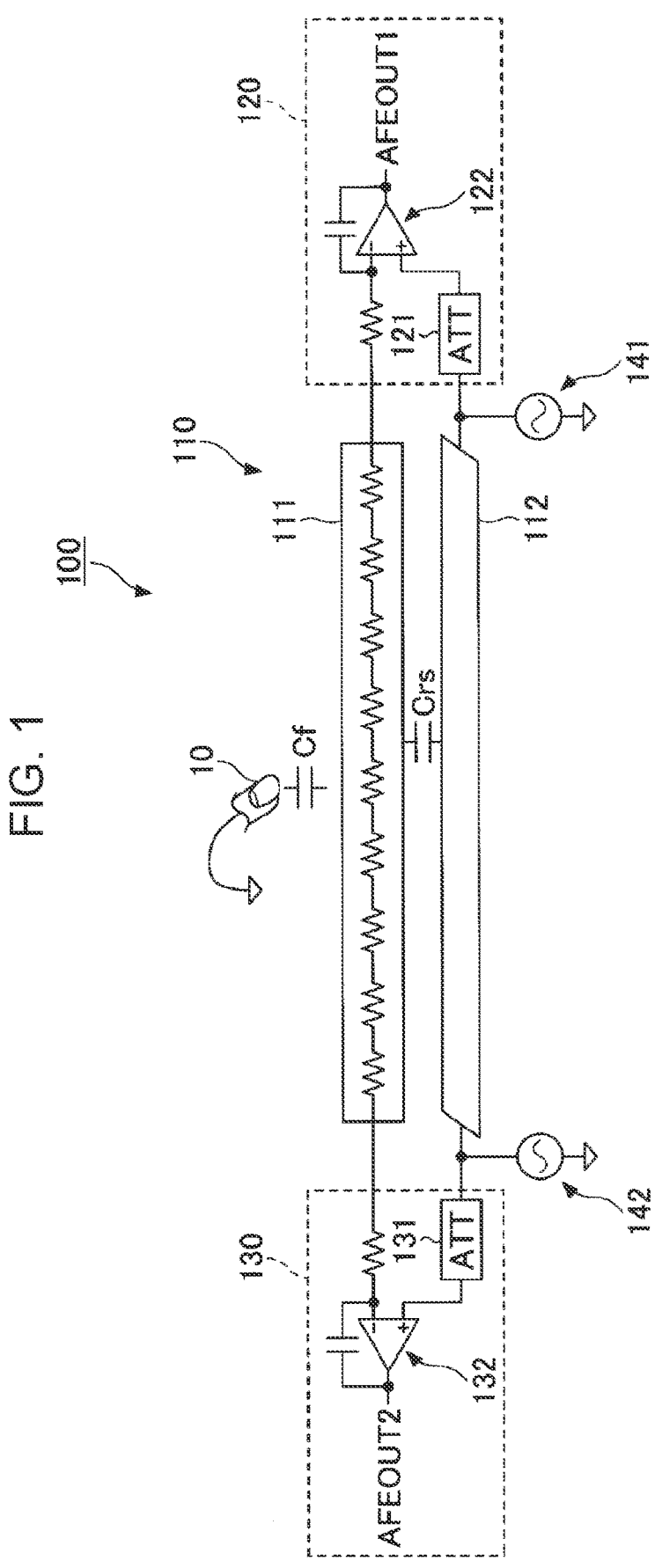
FIG. 1 is a diagram illustrating an exemplary structure of a capacitance detection device according to an embodiment.

FIG. 1 is a diagram illustrating an exemplary structure of a capacitance detection device 100 according to an embodiment. The capacitance detection device 100 illustrated in FIG. 1 is, for example, a touch panel for performing self-capacitance type capacitance detection and detects a capacitance between the capacitance detection device 100 and an object 10. That is, the capacitance detection device 100 can detect the proximity of the object 10 (e.g., the finger of an operator) to a detection electrode 111.

As illustrated in FIG. 1, the capacitance detection device 100 includes a capacitance detection unit 110, a first analog front end (AFE) block 120, a second AFE block 130, a first voltage output circuit 141, and a second voltage output circuit 142.

The capacitance detection unit 110 includes the detection electrode 111 and an active shield electrode 112. The detection electrode 111 is a thin and strip-shaped (longitudinal) member made of a conductive material. The detection electrode 111 detects a capacitance between the detection electrode 111 and the object 10. Specifically, the capacitance between the detection electrode 111 and the object 10 changes when the object 10 approaches the detection electrode 111. In the present embodiment, the detection electrode 111 is made of an indium tin oxide (ITO) having resistivity. The detection electrode 111 therefore has a resistance gradient between one end and the other end thereof in the longitudinal direction. In the present embodiment, the detection electrode 111 has, between one end and the other end thereof, a resistance value from 5 kΩ to 270 kΩ.

The active shield electrode 112 is a thin and strip-shaped member made of a conductive material. The active shield electrode 112 is disposed in proximity to the detection electrode 111. In the present embodiment, the active shield electrode 112 is provided on the rear side of the detection electrode 111. The active shield electrode 112 is driven at the same potential as the detection electrode 111 in response to an alternating voltage supplied from the first voltage output circuit 141 and the second voltage output circuit 142 thereto. The active shield electrode 112 is disposed such that a capacitance Crs between the active shield electrode 112 and the detection electrode 111 is a value from 30 pF to 130 pF. Although the first voltage output circuit 141 and the second voltage output circuit 142 are illustrated as separate voltage output circuits in FIG. 1, a single voltage output circuit may be used as the first voltage output circuit 141 and the second voltage output circuit 142.

The first AFE block 120 is connected to one end of the capacitance detection unit 110. The first AFE block 120 detects, from one end side of the capacitance detection unit 110, a capacitance between the detection electrode 111 and the object 10. The first AFE block 120 includes an ATT 121 and a first operational amplifier 122. The ATT 121 is an example of a "first adjustment circuit" and adjusts the amplitude of an alternating voltage output from the first voltage output circuit 141. That is, the ATT 121 adjusts the amplitude of an alternating voltage that is output from the first voltage output circuit 141 and is to be supplied to one end of the active shield electrode 112. The first operational amplifier 122 amplifies a voltage difference between an inverting input terminal (−) connected to one end of the detection electrode 111 and a non-inverting input terminal (+) to which an alternating voltage adjusted by the ATT 121 is applied and the first operational amplifier 122 outputs a result of the amplification to a host controller (not illustrated) as an output signal AFEOUT1.

The second AFE block 130 is connected to the other end of the capacitance detection unit 110. The second AFE block 130 detects, from the other end side of the capacitance detection unit 110, a capacitance between the detection electrode 111 and the object 10. The second AFE block 130 includes an ATT 131 and a second operational amplifier 132. The ATT 131 is an example of a "second adjustment circuit" and adjusts the amplitude of an alternating voltage output from the second voltage output circuit 142. That is, the ATT 131 adjusts the amplitude of an alternating voltage that is output from the second voltage output circuit 142 and is to be supplied to the other end of the active shield electrode 112. In the case where the first voltage output circuit 141 and the second voltage output circuit 142 are formed by the same (a single) voltage output circuit, the ATT 131 adjusts the amplitude of an alternating voltage output from the first voltage output circuit 141. The second operational amplifier 132 amplifies a voltage difference between an inverting input terminal (−) connected to the other end of the detection electrode 111 and a non-inverting input terminal (+) to which an alternating voltage adjusted by the ATT 131 is applied and the second operational amplifier 132 outputs a result of the amplification to the host controller as an output signal AFEOUT2.

Exemplary Laminated Structure of Capacitance Detection Unit

Figure 2:
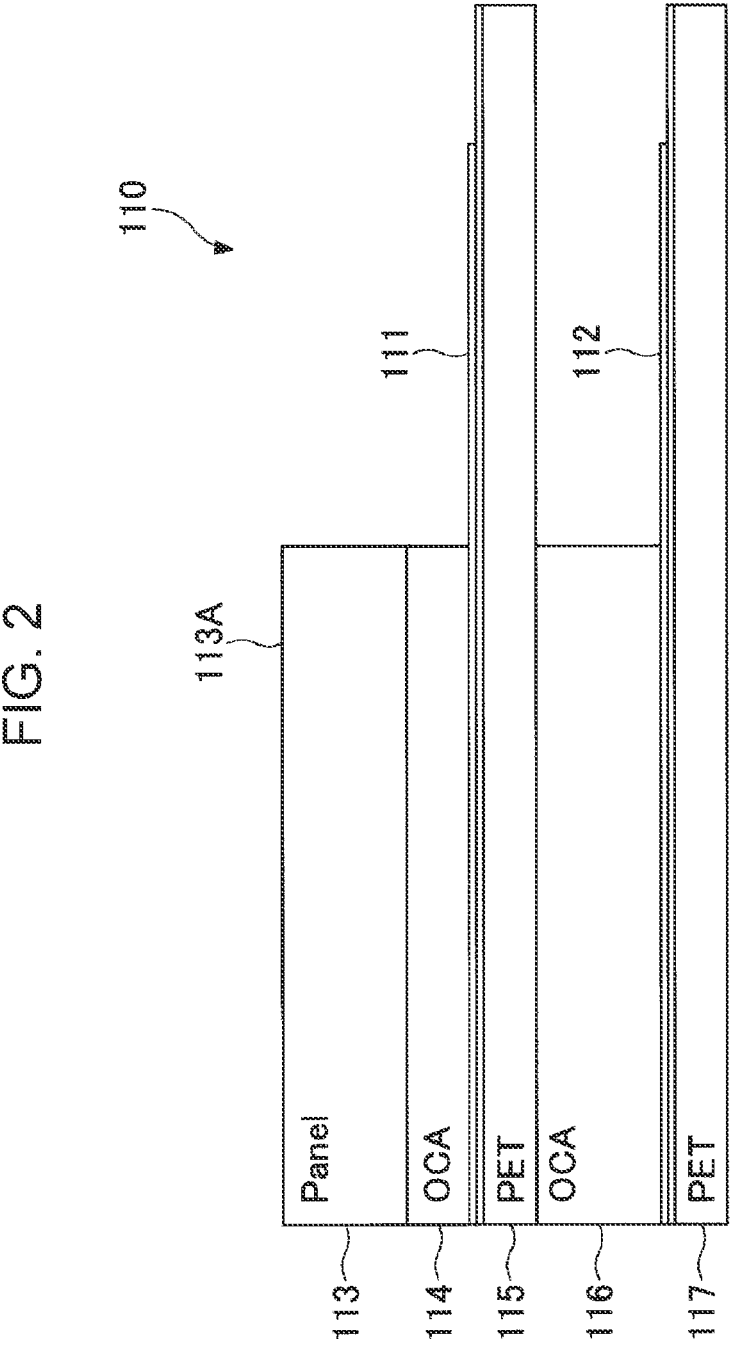
FIG. 2 is a diagram illustrating an exemplary laminated structure of a capacitance detection unit included in a capacitance detection device according to an embodiment.

FIG. 2 is a diagram illustrating an exemplary laminated structure of the capacitance detection unit 110 included in the capacitance detection device 100 according to an embodiment.

As illustrated in FIG. 2, the capacitance detection unit 110 has a laminated structure in which a plurality of thin members are laminated. In the example illustrated in FIG. 2, the capacitance detection unit 110 includes a panel 113, an optical clear adhesive (OCA) 114, the detection electrode 111, polyethylene terephthalate (PET) 115, an OCA 116, the active shield electrode 112, and PET 117 in this order from the front side (the upper side in the drawing).

The surface of the panel 113 is provided on the outermost front surface of the capacitance detection unit 110. The front surface of the panel 113 is a detection surface 113A to which an object performs a proximity operation.

The PET 115 is provided on the rear side of the panel 113. The PET 115 is a film-shaped flexible substrate. The detection electrode 111 is formed on the front surface of the PET 115. The front surface of the PET 115 is bonded to the back surface of the panel 113 by the OCA 114. The OCA 114 is a film-shaped adhesive sheet.

The PET 117 is provided on the rear side of the PET 115. The PET 117 is a film-shaped flexible substrate. The active shield electrode 112 is formed on the front surface of the PET 117. The front surface of the PET 117 is bonded to the back surface of the PET 115 by the OCA 116. The OCA 116 is a film-shaped adhesive sheet.

Exemplary Change in Capacitance Value

Figure 3:
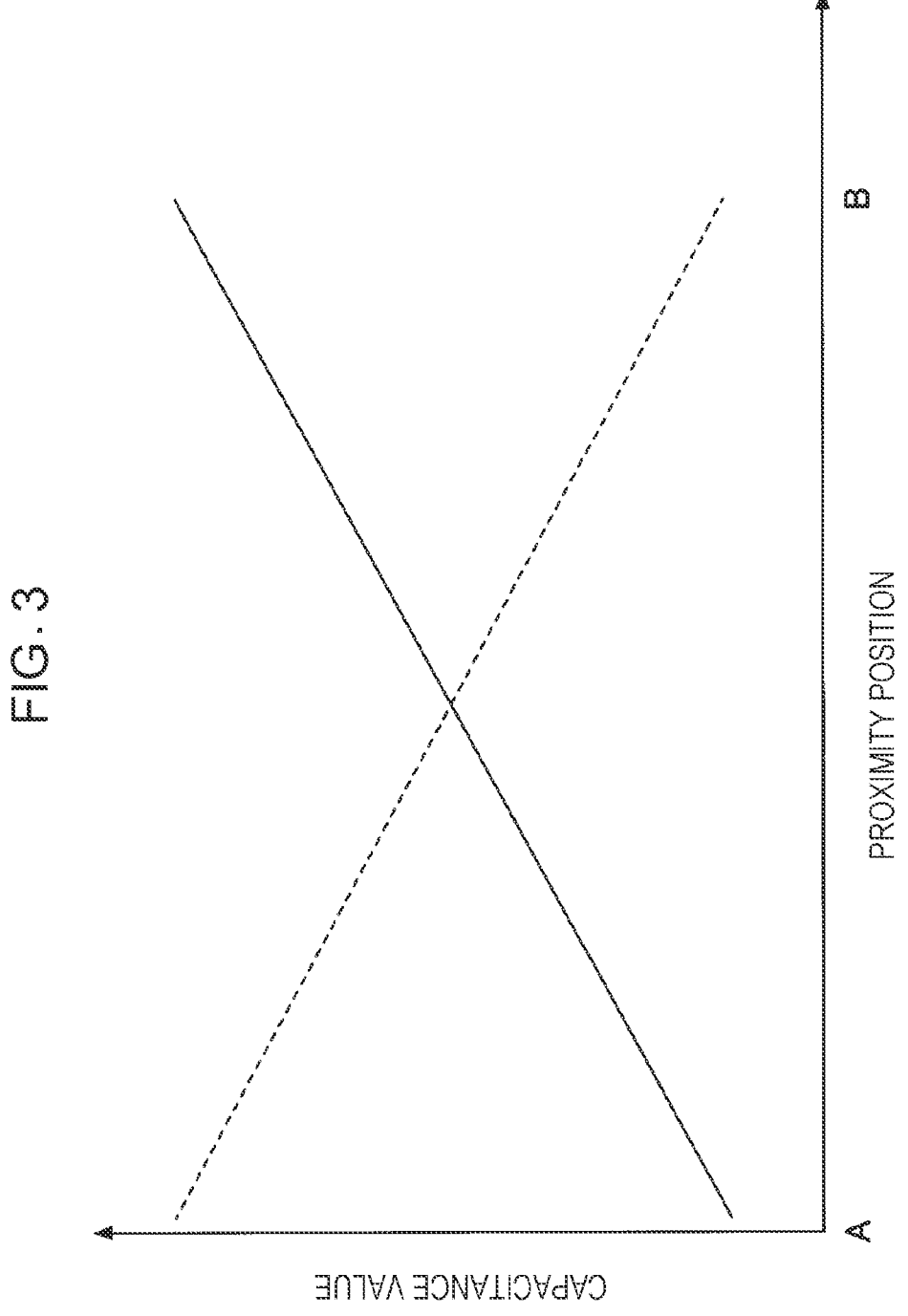
FIG. 3 is a diagram illustrating exemplary changes in capacitance values detected by a first analog front end (AFE) block and a second AFE block according to an embodiment.

FIG. 3 is a diagram illustrating exemplary changes in capacitance values detected by the first AFE block 120 and the second AFE block 130 according to an embodiment. As described above, the detection electrode 111 has a resistance gradient between one end and the other end thereof.

Accordingly, the closer the proximity position of the object 10 with respect to the detection electrode 111 approaches one end of the detection electrode 111 (B illustrated in FIG. 3), the smaller the resistance value between one end of the detection electrode 111 and the object 10. That is, a capacitance value (represented by a solid line in FIG. 3) detected by the first AFE block 120 provided on the one end side of the detection electrode 111 gradually increases.

In contrast, the closer the proximity position of the object 10 with respect to the detection electrode 111 approaches one end of the detection electrode 111 (B illustrated in FIG. 3), the larger the resistance value between the other end (A illustrated in FIG. 3) of the detection electrode 111 and the object 10. That is, a capacitance value (represented by a dotted line in FIG. 3) detected by the second AFE block 130 provided on the other end side of the detection electrode 111 gradually decreases.

Accordingly, the host controller can specify the proximity position of the object 10 with respect to the detection electrode 111 using the ratio between a capacitance value detected by the first AFE block 120 and a capacitance value detected by the second AFE block 130.

Exemplary Change in Output Voltage Value

Figure 4:
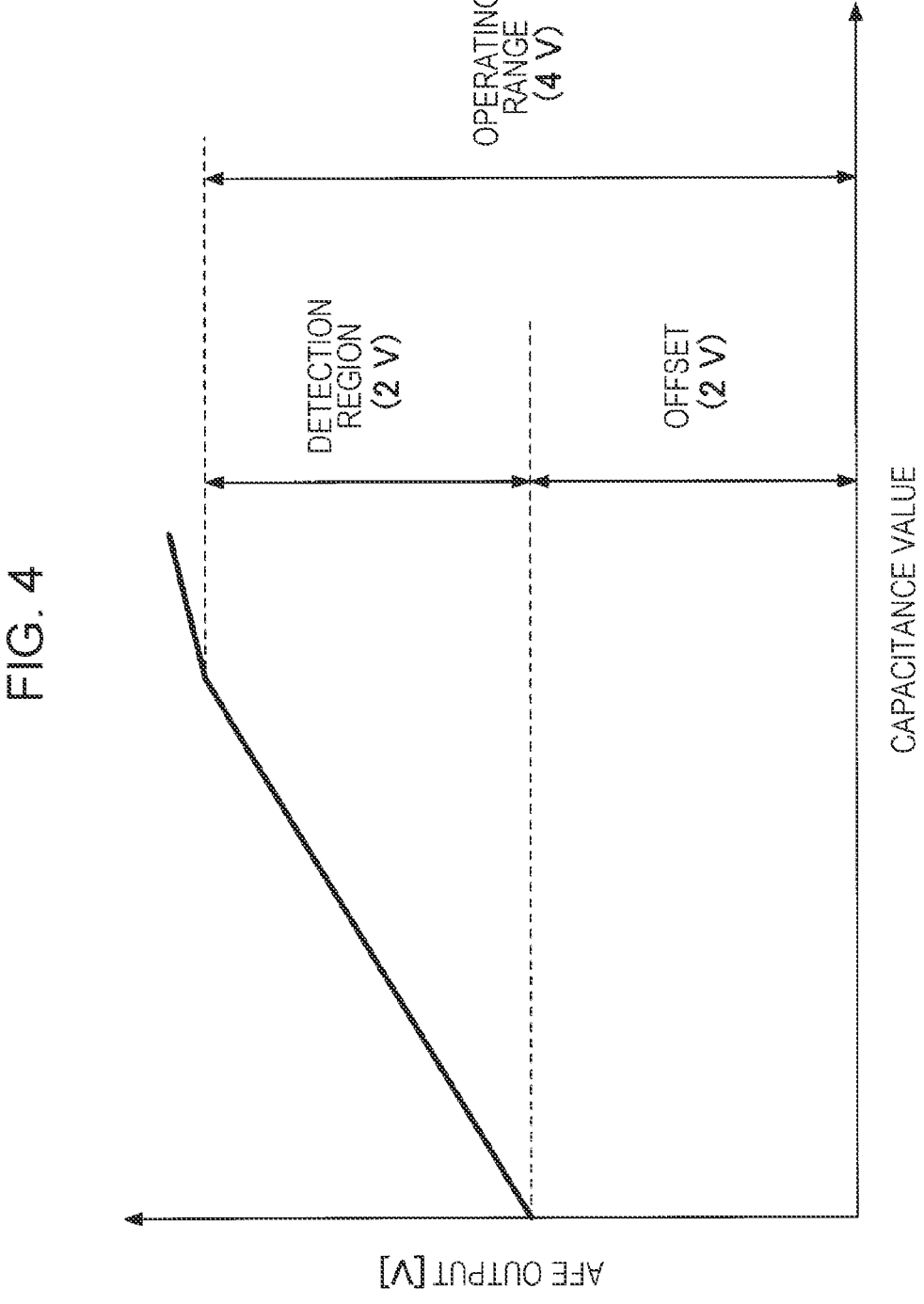
FIG. 4 is a diagram illustrating an exemplary change in the output voltage value of each of a first AFE block and a second AFE block according to an embodiment.

FIG. 4 is a diagram illustrating an exemplary change in the output voltage value of each of the first AFE block 120 and the second AFE block 130 according to an embodiment.

In the present embodiment, a voltage to be supplied to the first AFE block 120 and the second AFE block 130 is 5 V that is the minimum voltage value enabling hover detection. In the example illustrated in FIG. 4, the range of 0 to 4 V is used as the operating range of the output voltage of each of the first AFE block 120 and the second AFE block 130.

In the operating range, the range of 0 to 2 V is used as the voltage range of an offset voltage generated in accordance with the stray capacitance of the detection electrode 111. The range of 2 to 4 V is used as the voltage range of a detection region where a voltage value linearly changes in accordance with the detection position of the object 10.

That is, in the first AFE block 120 and the second AFE block 130 according to an embodiment, the voltage range of 2 V is needed as the voltage range of a detection region to appropriately perform detection of the position of the object 10 including detection of a hover operation from an output voltage value. For this, the voltage range of an offset voltage needs to be less than or equal to 2 V.

Suitable Ranges of Resistance Value Rp and Capacitance Crs

Figure 5:
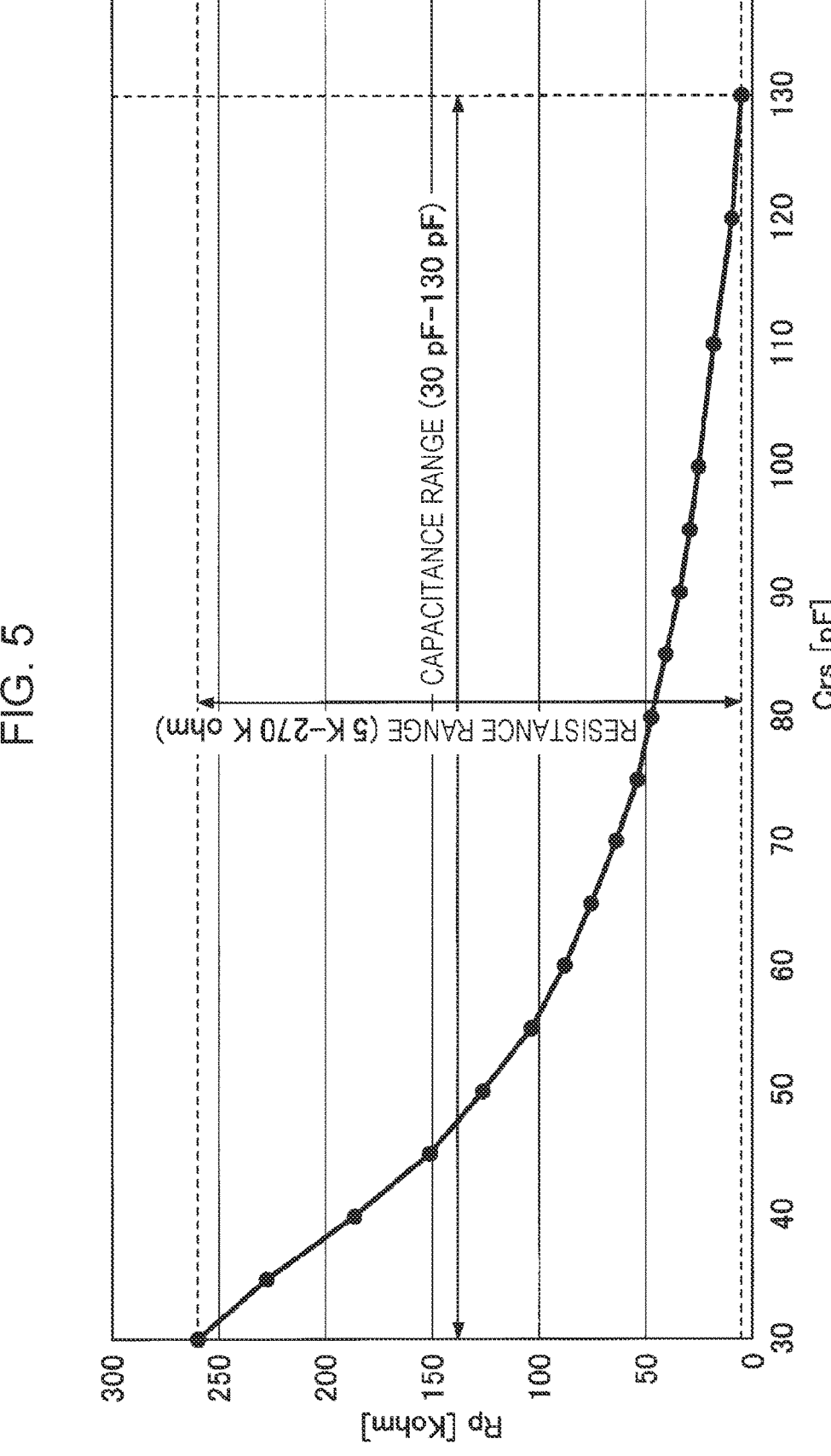
FIG. 5 is a diagram illustrating a result of a simulation of a region where the voltage range of an offset voltage is less than or equal to 2 V in a capacitance detection unit according to an embodiment.

FIG. 5 is a diagram illustrating a result of a simulation of a region (the range of a resistance value and the range of a capacitance value) where the voltage range of an offset voltage is less than or equal to 2 V in the capacitance detection unit 110 according to an embodiment (having the laminated structure illustrated in FIG. 2).

In the graph illustrated in FIG. 5, the vertical axis represents the resistance value Rp between one end and the other end of the detection electrode 111. In the graph illustrated in FIG. 5, the horizontal axis represents the capacitance Crs between the detection electrode 111 and the active shield electrode 112.

As is apparent from the simulation result illustrated in FIG. 5, the voltage range of an offset voltage can be less than or equal to 2 V in the first AFE block 120 and the second AFE block 130 according to an embodiment by setting the resistance value Rp between one end and the other end of the detection electrode 111 to a value from 5 kΩ to 270 kΩ and setting the capacitance Crs between the detection electrode 111 and the active shield electrode 112 to a value from 30 pF to 130 pF. As a result, the capacitance detection device 100 according to an embodiment can appropriately perform detection of the position of the object 10 including detection of a hover operation from the output voltage values of the first AFE block 120 and the second AFE block 130.

In an actual product, the above suitable ranges of the resistance value Rp and the capacitance Crs are obtained by adjusting the size of the detection electrode 111 and the gap between the detection electrode 111 and the active shield electrode 112.

The case will be described where the resistance value Rp and the capacitance Crs are out of the above suitable ranges.

For example, when the resistance value Rp is less than 5 kΩ, the offset voltage is greater than 2 V and a sensor detection range may be reduced. When the resistance value Rp is less than 5 kΩ, the change in a capacitance value due to the change in the proximity position of the object 10 becomes excessively small. Accordingly, the proximity position of the object 10 may not be accurately detected from a capacitance value.

When the resistance value Rp is greater than 270 kΩ, the offset voltage is greater than 2 V and a sensor detection range may be reduced. When the resistance value Rp is greater than 270 kΩ, a capacitance does not linearly change because of the excessively high resistance value and the proximity position of the object 10 may not be accurately detected from a capacitance value. When the resistance value Rp is greater than 270 kΩ, an SN ratio may deteriorate because of the high impedance of the detection electrode 111.

When the capacitance Crs is less than 30 pF, the offset voltage is greater than 2 V and a sensor detection range may be reduced. To expand the sensor detection range, the value of a level shift capacitor included in the active shield electrode 112 in an IC needs to be increased. This may be the design constraint of the IC.

When the capacitance Crs is greater than 130 pF, the offset voltage is greater than 2 V and a sensor detection range may be reduced. Since the value of an adjustment capacitor in an IC becomes small in this case, this is not the design constraint of the IC. However, an offset may not be completely removed because of a phase lag caused by a capacitance. Although the addition of a phase adjustment circuit is effective for the improvement of this case, a circuit size may be increased.

First Example of Application of Capacitance Detection Device

Figure 6:
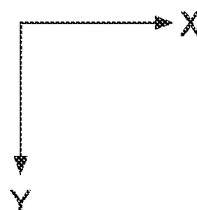
FIG. 6 is a diagram illustrating the structure of a slider that is a first example of application of a capacitance detection device according to an embodiment.

FIG. 6 is a diagram illustrating the structure of a slider 20 that is a first example of application of the capacitance detection device 100 according to an embodiment. As illustrated in FIG. 6, the slider 20 includes a single detection electrode 111A linearly extending in a lateral direction and an active shield electrode 112A provided on the rear side of the detection electrode 111. One end and the other end of the detection electrode 111A are each connected to a control circuit 22 via a connection line 118. The active shield electrode 112A is connected to the control circuit 22 via the connection line 118. The control circuit 22 includes the first AFE block 120, the second AFE block 130, the first voltage output circuit 141, and the second voltage output circuit 142 (all of which are illustrated in FIG. 1). For example, the detection electrode 111A has the same cross-sectional structure as the detection electrode 111 illustrated in FIG. 2.

In the slider 20 having the above structure, the capacitance value of the detection electrode 111A changes in accordance with the proximity position of the object 10 with respect to the detection electrode 111A and the output voltage value of the first AFE block 120 and the output voltage value of the second AFE block 130 change in the control circuit 22. The control circuit 22 can detect the proximity position of the object 10 with respect to the detection electrode 111A on the basis of the ratio between the output voltage value of the first AFE block 120 and the output voltage value of the second AFE block 130.

In particular, the resistance value Rp between one end and the other end of the detection electrode 111A is a value from 5 kΩ to 270 kΩ and the capacitance Crs between the detection electrode 111A and the active shield electrode 112A is a value from 30 pF to 130 pF in the slider 20.

As a result, the control circuit 22 can accurately detect the proximity position of the object 10 from the one end side of the detection electrode 111A on the basis of the output voltage value of the first AFE block 120 and can accurately detect the proximity position of the object 10 from the other end side of the detection electrode 111A on the basis of the output voltage value of the second AFE block 130. Accordingly, the control circuit 22 can accurately detect the proximity position of the object 10 with respect to the detection electrode 111A using the ratio between the output voltage value of the first AFE block 120 and the output voltage value of the second AFE block 130.

Second Example of Application of Capacitance Detection Device

Figure 7:
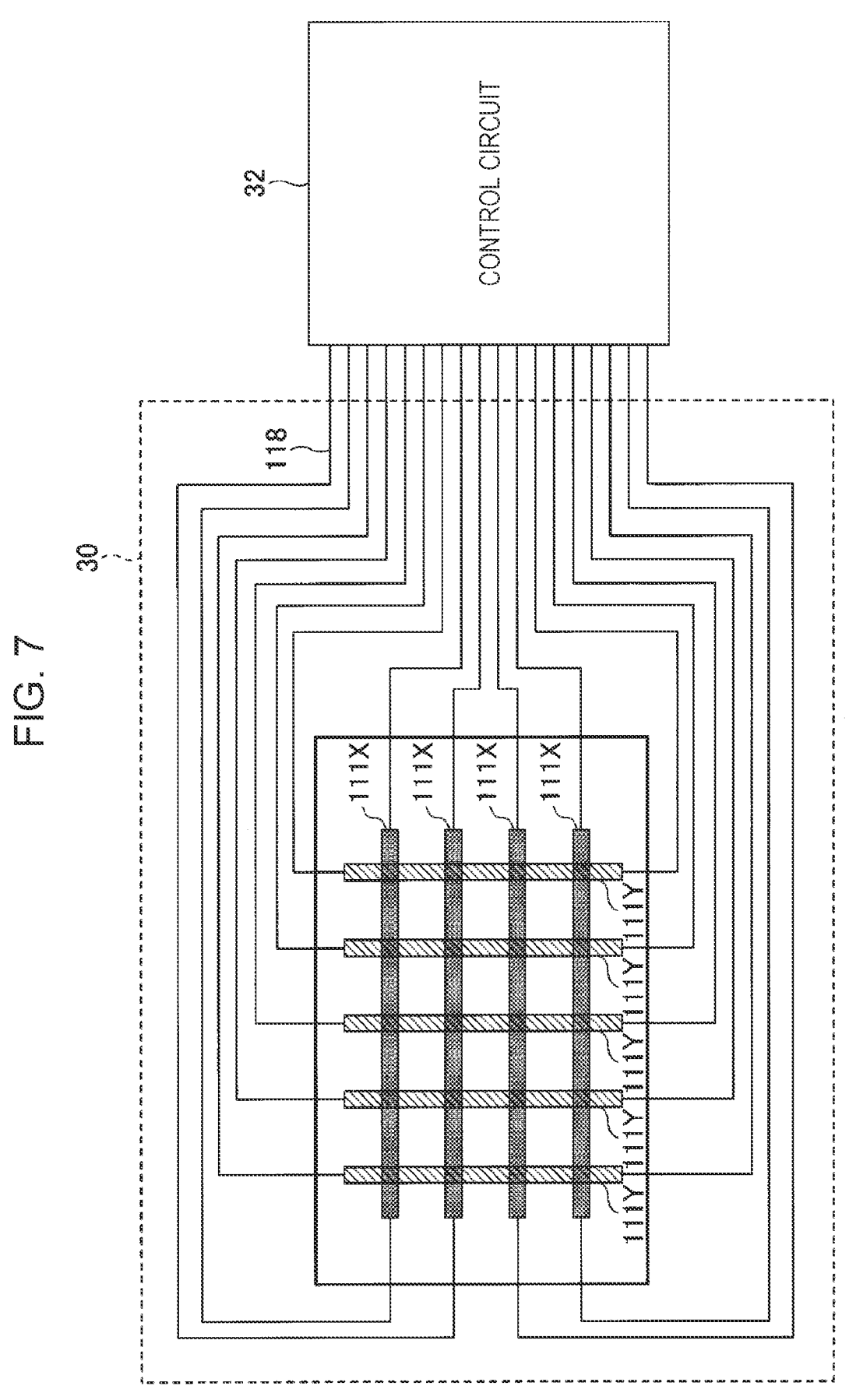
FIG. 7 is a diagram illustrating the structure of a touch panel that is a second example of application of a capacitance detection device according to an embodiment.

FIG. 7 is a diagram illustrating the structure of a touch panel 30 that is a second example of application of the capacitance detection device 100 according to an embodiment. As illustrated in FIG. 7, the touch panel 30 includes a plurality of first detection electrodes 111X and a plurality of second detection electrodes 111Y.

The first detection electrodes 111X are the detection electrodes 111 linearly extending in the lateral direction (the X-axis direction and an example of a "first direction"). The first detection electrodes 111X are arranged in parallel to each other at regular intervals in the vertical direction (the Y-axis direction). The first detection electrodes 111X are disposed such that they are perpendicular to each of the second detection electrodes 111Y. One end and the other end of each of the first detection electrodes 111X are connected to a control circuit 32 via a connection line 118. In the control circuit 32, the first AFE block 120, the second AFE block 130, the first voltage output circuit 141, and the second voltage output circuit 142 (all of which are illustrated in FIG. 1) are provided for each of the first detection electrodes 111X. For example, each of the first detection electrodes 111X has the same cross-sectional structure as the detection electrode 111 illustrated in FIG. 2. Although the touch panel 30 includes four first detection electrodes 111X in the example illustrated in FIG. 7, the number of first detection electrodes 111X is not limited thereto.

The second detection electrodes 111Y are the detection electrodes 111 linearly extending in the vertical direction (the Y-axis direction and an example of a "second direction"). The second detection electrodes 111Y are arranged in parallel to each other at regular intervals in the lateral direction (the X-axis direction). The second detection electrodes 111Y are disposed such that they are perpendicular to each of the first detection electrodes 111X. One end and the other end of each of the second detection electrodes 111Y are connected to the control circuit 32 via the connection line 118. In the control circuit 32, the first AFE block 120, the second AFE block 130, the first voltage output circuit 141, and the second voltage output circuit 142 (all of which are illustrated in FIG. 1) are provided for each of the second detection electrodes 111Y. For example, each of the second detection electrodes 111Y has the same cross-sectional structure as the detection electrode 111 illustrated in FIG. 2. Although the touch panel 30 includes five second detection electrodes 111Y in the example illustrated in FIG. 7, the number of second detection electrodes 111Y is not limited thereto.

In the touch panel 30 having the above structure, the capacitance values of the first detection electrodes 111X change in accordance with the respective proximity positions of the object 10 with respect to the first detection electrodes 111X (that is, the respective proximity positions in the lateral direction (X-axis direction)) and the output voltage values of the first AFE blocks 120 connected to respective one ends of the first detection electrodes 111X and the output voltage values of the second AFE blocks 130 connected to the respective other ends of the first detection electrodes 111X change in the control circuit 32. The control circuit 32 can therefore detect the proximity position of the object 10 with respect to the touch panel 30 in the lateral direction (X-axis direction) on the basis of the ratio between the output voltage value of the first AFE block 120 and the output voltage value of the second AFE block 130.

In the touch panel 30 having the above structure, the capacitance values of the second detection electrodes 111Y change in accordance with the respective proximity positions of the object 10 with respect to the second detection electrodes 111Y (that is, the respective proximity positions in the vertical (Y-axis direction)) and the output voltage values of the first AFE blocks 120 connected to respective one ends of the second detection electrodes 111Y and the output voltage values of the second AFE blocks 130 connected to the respective other ends of the second detection electrodes 111Y change in the control circuit 32. The control circuit 32 can therefore detect the proximity position of the object 10 with respect to the touch panel 30 in the vertical direction (Y-axis direction) on the basis of the ratio between the output voltage value of the first AFE block 120 and the output voltage value of the second AFE block 130.

In particular, the resistance value Rp between one end and the other end of each of the first detection electrodes 111X and the second detection electrodes 111Y is a value from 5 kΩ to 270 kΩ and the capacitance Crs between each of the first detection electrodes 111X and the second detection electrodes 111Y and the active shield electrode 112 is a value from 30 pF to 130 pF in the touch panel 30.

As a result, the control circuit 32 can accurately detect the proximity position of the object 10 in the lateral direction (X-axis direction) from the one end side of each of the first detection electrodes 111X on the basis of the output voltage value of the first AFE block 120 connected to the first detection electrode 111X and can accurately detect the proximity position of the object 10 in the lateral direction (X-axis direction) from the other end side of each of the first detection electrodes 111X on the basis of the output voltage value of the second AFE block 130 connected to the first detection electrode 111X. Accordingly, the control circuit 32 can accurately detect the proximity position of the object 10 with respect to the touch panel 30 in the lateral direction (X-axis direction) using the ratio between the output voltage value of the first AFE block 120 and the output voltage value of the second AFE block 130.

The control circuit 32 can accurately detect the proximity position of the object 10 in the vertical direction (Y-axis direction) from the one end side of each of the second detection electrodes 111Y on the basis of the output voltage value of the first AFE block 120 connected to the second detection electrode 111Y and can accurately detect the proximity position of the object 10 in the vertical direction (Y-axis direction) from the other end side of each of the second detection electrodes 111Y on the basis of the output voltage value of the second AFE block 130 connected to the second detection electrode 111Y. Accordingly, the control circuit 32 can accurately detect the proximity position of the object 10 with respect to the touch panel 30 in the vertical direction (Y-axis direction) using the ratio between the output voltage value of the first AFE block 120 and the output voltage value of the second AFE block 130.

As described above, the capacitance detection device 100 according to an embodiment for detecting a capacitance between the detection electrode 111 and the object 10 in proximity to the detection electrode 111 includes the detection electrode 111 configured to detect a capacitance between the detection electrode 111 and the object 10, the active shield electrode 112 disposed in proximity to the detection electrode 111, the first voltage output circuit 141 configured to output an alternating voltage to be supplied to the active shield electrode 112, the ATT 121 configured to adjust an amplitude of an alternating voltage output from the first voltage output circuit 141, and the first operational amplifier 122 configured to amplify a voltage difference between an inverting input terminal thereof connected to one end of the detection electrode 111 and a non-inverting input terminal thereof to which an alternating voltage adjusted by the ATT 121 is applied and output the amplified voltage difference. The detection electrode 111 has, between one end and the other end of the detection electrode 111, a resistance value from 5 kΩ to 270 kΩ.

The capacitance detection device 100 according to an embodiment can therefore suitably obtain, in the operating range of the first operational amplifier 122, the voltage range of a detection region for the suitable detection of the position of the object 10 including detection of a hover operation by defining the range of the resistance value of the detection electrode 111 as described above. Accordingly, the capacitance detection device 100 according to an embodiment can appropriately perform detection of the position of the object 10 including detection of a hover operation using the output voltage value of the first operational amplifier 122.

The capacitance detection device 100 according to an embodiment may further include the ATT 131 configured to adjust an amplitude of an alternating voltage output from the second voltage output circuit 142 and the second operational amplifier 132 configured to amplify a voltage difference between an inverting input terminal thereof connected to the other end of the detection electrode 111 and a non-inverting input terminal thereof to which an alternating voltage adjusted by the ATT 131 is applied and output the amplified voltage difference.

The capacitance detection device 100 according to an embodiment can therefore further appropriately perform detection of the position of the object 10 including detection of a hover operation using the output voltage value of the second operational amplifier 132. Accordingly, the capacitance detection device 100 according to an embodiment can more accurately detect the position of the object 10 using the ratio between the output voltage value of the first operational amplifier 122 on the one end side of the detection electrode 111 and the output voltage value of the second operational amplifier 132 on the other end side of the detection electrode 111.

In the capacitance detection device 100 according to an embodiment, a capacitance between the detection electrode 111 and the active shield electrode 112 may be a value from 30 pF to 130 pF.

The capacitance detection device 100 according to an embodiment can therefore suitably obtain, in the operating ranges of the first operational amplifier 122 and the second operational amplifier 132, the voltage range of a detection region for the suitable detection of the position of the object 10 including detection of a hover operation by defining the range of the capacitance between the detection electrode 111 and the active shield electrode 112 as described above. Accordingly, the capacitance detection device 100 according to an embodiment can more appropriately perform detection of the position of the object 10 including detection of a hover operation using the output voltage values of the first operational amplifier 122 and the second operational amplifier 132.

In the capacitance detection device 100 according to an embodiment, the detection electrode 111 may be formed of an ITO.

The capacitance detection device 100 according to an embodiment can therefore provide a resistance gradient for the detection electrode 111 and appropriately perform detection of the position of the object 10 including detection of a hover operation by a method using the resistance gradient.

Although an embodiment of the present invention has been described in detail above, the present invention is not limited to the embodiment, and various changes and modifications can be made thereto within the spirit of the present invention recited in the claims.

For example, the detection electrode 111 may have a structure in which an AFE block is connected to only one end or the other end of the detection electrode 111 in the capacitance detection device 100. Also in this case, the capacitance detection device 100 can accurately detect the proximity position of the object 10 with respect to the detection electrode 111 using the output voltage of the AFE block by the resistance value Rp and the capacitance Crs being in the above respective suitable ranges.

What is claimed is:

1. A capacitance detection device for detecting a capacitance between the capacitance detection device and an object, the capacitance detection device comprising:

a detection electrode configured to detect a capacitance between the detection electrode and the object;

an active shield electrode disposed in proximity to the detection electrode;

a voltage output circuit configured to output an alternating voltage to be supplied to the active shield electrode;

a first adjustment circuit configured to adjust an amplitude of the alternating voltage output from the voltage output circuit;

a first operational amplifier configured to amplify a voltage difference between an inverting input terminal of the first operational amplifier and a non-inverting input terminal of the first operational amplifier, thereby outputting a first amplified voltage difference, the inverting input terminal being connected to one end of the detection electrode, the non-inverting input terminal receiving the alternating voltage adjusted by the first adjustment circuit;

a second adjustment circuit configured to adjust the amplitude of the alternating voltage output from the voltage output circuit; and a second operational amplifier configured to amplify a voltage difference between an inverting input terminal of the second operational amplifier and a non-inverting input terminal of the second operational amplifier, thereby outputting a second amplified voltage difference, the inverting input terminal of the second operational amplifier being connected to the other end of the detection electrode, the non-inverting input terminal of the second amplifier receiving the alternating voltage adjusted by the second adjustment circuit, wherein the detection electrode has, between the one end and another end of the detection electrode, a resistance value within a first predetermined range, while the active shield electrode is disposed such that a capacitance between the active shield electrode and the detection electrode has a value within a second predetermined range, wherein the first predetermined range and the second predetermined range are determined based on an operating range of an output voltage of at least one of the first operational amplifier and the second operational amplifier, such that an offset voltage of the capacitance detection device is smaller than a predetermined voltage.

2. A capacitance detection device for detecting a capacitance between the capacitance detection device and an object, the capacitance detection device comprising:

a detection electrode configured to detect a capacitance between the detection electrode and the object;

an active shield electrode disposed in proximity to the detection electrode;

a voltage output circuit configured to output an alternating voltage to be supplied to the active shield electrode;

a first adjustment circuit configured to adjust an amplitude of the alternating voltage output from the voltage output circuit;

a first operational amplifier configured to amplify a voltage difference between an inverting input terminal of the first operational amplifier and a non-inverting input terminal of the first operational amplifier, thereby outputting a first amplified voltage difference, the inverting input terminal being connected to one end of the detection electrode, the non-inverting input terminal receiving the alternating voltage adjusted by the first adjustment circuit;

a second adjustment circuit configured to adjust the amplitude of the alternating voltage output from the voltage output circuit; and a second operational amplifier configured to amplify a voltage difference between an inverting input terminal of the second operational amplifier and a non-inverting input terminal of the second operational amplifier, thereby outputting a second amplified voltage difference, the inverting input terminal of the second operational amplifier being connected to the other end of the detection electrode, the non-inverting input terminal of the second amplifier receiving the alternating voltage adjusted by the second adjustment circuit, wherein the detection electrode has a resistance value from 5 kΩ to 270 kΩ between the one end and another end of the detection electrode, and the active shield electrode is disposed such that a capacitance between the active shield electrode and the detection electrode becomes a value from 30 pF to 130 pF.

3. The capacitance detection device according to claim 2, wherein the detection electrode is made of an indium tin oxide (ITO).

4. The capacitance detection device according to claim 2, wherein the capacitance detection device includes a slider formed of the single detection electrode.

5. The capacitance detection device according to claim 2, wherein the capacitance detection device includes:

a touch panel formed of a plurality of the first detection electrodes extending in a first direction; and a plurality of the second detection electrodes extending in a second direction perpendicular to the first direction.

6. The capacitance detection device according to claim 1, wherein the first predetermined range is from 5 kΩ to 270 kΩ and the second predetermined range is from 30 pF to 130 pF.

*    *    *    *    *